United States Patent
Reiss et al.

(10) Patent No.: US 12,552,226 B2
(45) Date of Patent: *Feb. 17, 2026

(54) METHOD FOR DETERMINING A FRESH AIR VOLUME FLOW IN A VEHICLE FOR TRANSPORTING PEOPLE, AND DEVICE FOR CARRYING OUT THE METHOD

(71) Applicant: Siemens Mobility GmbH, Munich (DE)

(72) Inventors: Gerhard Reiss, Krefeld (DE); Alexander Hildebrandt, Bochum (DE)

(73) Assignee: Siemens Mobility GmbH, Munich (DE)

( * ) Notice: Subject to any disclaimer, the term of this patent is extended or adjusted under 35 U.S.C. 154(b) by 365 days.

This patent is subject to a terminal disclaimer.

(21) Appl. No.: 18/044,626

(22) PCT Filed: Aug. 6, 2021

(86) PCT No.: PCT/EP2021/072019
§ 371 (c)(1),
(2) Date: Mar. 9, 2023

(87) PCT Pub. No.: WO2022/053235
PCT Pub. Date: Mar. 17, 2022

(65) Prior Publication Data
US 2023/0331062 A1    Oct. 19, 2023

(30) Foreign Application Priority Data
Sep. 9, 2020    (DE) ..................... 10 2020 211 304.1

(51) Int. Cl.
*B60H 1/00* (2006.01)
*B61D 27/00* (2006.01)

(52) U.S. Cl.
CPC ......... *B60H 1/008* (2013.01); *B60H 1/00785* (2013.01)

(58) Field of Classification Search
CPC ..... B60H 1/00785; B60H 1/008; B61D 27/00
See application file for complete search history.

(56) References Cited

U.S. PATENT DOCUMENTS

| 8,375,732 B2 | 2/2013 | Hofhaus et al. |
| 8,615,327 B2 | 12/2013 | Takagi et al. |

(Continued)

FOREIGN PATENT DOCUMENTS

| DE | 4333173 A1 | 3/1995 |
| DE | 102007056356 A1 | 5/2009 |

(Continued)

OTHER PUBLICATIONS

WO2020107851 and translation (Year: 2020).*

*Primary Examiner* — Steven S Anderson, II
(74) *Attorney, Agent, or Firm* — Laurence A. Greenberg; Werner H. Stemer; Ralph E. Locher

(57) ABSTRACT

A method for determining a fresh air volume flow in a vehicle for transporting persons. A water vapor mass flow is introduced into, or generated in, a passenger compartment of the vehicle. The air humidity in the passenger compartment of the vehicle is measured and, once a quasi-stationary air humidity has been reached, the fresh air volume flow is calculated by considering the following: a fresh air volume flow [m³/h]; a mass of the evaporated water in the compartment [kg/h]; a number of people in the space; a water mass flow produced per person; a density of the fresh air (humid air) [kg/m³]; a is specific air humidity of the fresh air [kg/kg]; a density of the ambient air (humid air) [kg/m³]; and a specific air humidity of the ambient air [kg/kg]. There is also described a device for carrying out the method.

10 Claims, 1 Drawing Sheet

(56) References Cited

U.S. PATENT DOCUMENTS 12,269,516 B2 *  4/2025  Hildebrandt ....... B60H 1/00849
2004/0152408 A1   8/2004  Eckhardt

FOREIGN PATENT DOCUMENTS

DE    102010048340 A1    4/2011
EP         3326850 A1    5/2018
WO         02074600 A1   9/2002
WO    WO-2020107851 A1 *  6/2020  .............. F24F 11/38

* cited by examiner

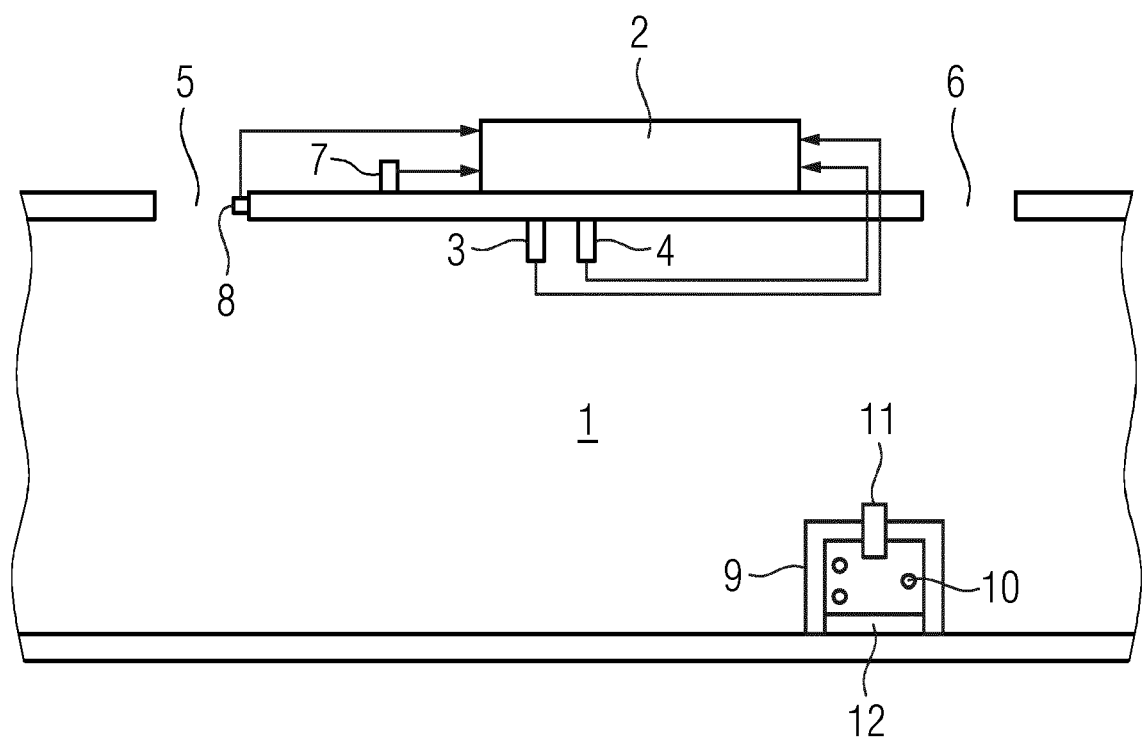

METHOD FOR DETERMINING A FRESH AIR VOLUME FLOW IN A VEHICLE FOR TRANSPORTING PEOPLE, AND DEVICE FOR CARRYING OUT THE METHOD

FIELD AND BACKGROUND OF THE INVENTION

The invention relates to a method for determining a fresh air volume flow in a vehicle for transporting people and to a device for carrying out such a method.

8 For rail vehicles, for example, the EU regulation Nr.1302/2014 ("TSI Loc/Pas") defines requirements for an air quality in the interior of the vehicle, a maximum permissible carbon dioxide content having to be complied with in particular. In the relevant European standards for air conditioning comfort in rail vehicles, such as EN 14813, EN 14750 and EN 13129, fresh air volume flows which are to be complied with per passenger are explicitly mentioned. These requirements are collated in customer requirement specifications. Metrological verification of compliance with the required air quality, or fresh air volume flows, is therefore essential particularly in rail vehicles.

In order to measure a fresh air volume flow, it is known to fit so-called volume flow capture hoods externally on designated fresh air openings of the air conditioning system. In this case, this measurement technique is used for the required verification. However, the use of volume flow capture hoods is not possible in all vehicles.

In the case of covered fresh air openings during the journey or when sealing defects of the vehicle are to be included in the verification, so-called tracer gas measurements (also referred to as trace gas measurements or indicator gas measurements) need to be carried out.

In a tracer gas measurement, a defined tracer gas mass flow is introduced into the passenger compartment of the vehicle. The fresh air volume flow and the outgoing air mass flow reduce a tracer gas concentration by flushing the passenger compartment. After a quasi-stationary tracer gas concentration is reached, the fresh air volume flow may be calculated from the mass balance of the tracer gas, with the assumption that the fresh air volume flow is equal to the outgoing air volume flow. The term "quasi-stationary" is intended to mean that the result of the determination of the fresh air volume flow remains within a tolerance of +/−10% (around the current average value), preferably +/−5%, in the steady state.

The currently prevailing fresh air volume flow may be calculated from the fresh air mass flow by using the density.

For use as a tracer gas, carbon dioxide is employed because of its noncombustibility. However, carbon dioxide must be classed as hazardous because people, and therefore any measurement personnel, cannot smell or taste carbon dioxide. In the event of accidents when dealing with carbon dioxide, there may be a threat to life. For these reasons, various safety rules have to be followed when using carbon dioxide as a tracer gas for a measurement of the fresh air volume flow. In particular, it is dangerous for the measurement personnel to remain in a passenger compartment which has been supplied with carbon dioxide. Specifically, fresh air volume flow measurement with the aid of carbon dioxide as a tracer gas requires temporary provision of the following:

secure storage and transport framework for carbon dioxide pressure cylinders (upright),
holder for the pressure vessels during use,
carbon dioxide,
gas prewarmer,
pressure reducer,
computer-controlled regulating valve for the carbon dioxide mass flow,
carbon dioxide sensors for measuring the carbon dioxide content in the compartment,
carbon dioxide sensors for measuring the carbon dioxide content in the external air,
control and evaluation software. SUMMARY OF THE INVENTION Against this background, the object of the present invention is to make a fresh air volume flow measurement in a vehicle for transporting people less demanding in respect of the metrological outlay for carrying out tracer measurements.

In respect of the method, this object is achieved by a method having the features as claimed.

Accordingly, a method for determining a fresh air volume flow in a vehicle for transporting people is provided, comprising the steps:

a) introducing or generating a defined water vapor mass flow into/in a passenger compartment of the vehicle,
b) monitoring an air humidity in the passenger compartment of the vehicle, and
c) after a quasi-stationary air humidity has been reached in the passenger compartment, calculating the fresh air volume flow according to the following equation:

$$\dot{V}_{fr} = \frac{\dot{m}_{ev} + n \cdot \dot{m}_p}{\rho_{fr} \cdot x_{fr} - \rho_i \cdot x_i}$$

with
$\dot{V}_{fr}$ fresh air volume flow [m³/h]
$\dot{m}_{ev}$ mass of the evaporated water in the interior [kg/h]
n number of people in the compartment
$\dot{m}_p$ water mass flow given off by a person [kg/h]
$\rho_{fr}$ density of the fresh air (humid air) [kg/m³]
$x_{fr}$ specific air humidity of the fresh air [kg/kg]
$\rho_i$ density of the compartment air (humid air) [kg/m³]
$x_i$ specific air humidity of the compartment air [kg/kg].

One essential difference from the method known in the prior art for measuring a fresh air volume flow is that, according to the technical teaching proposed here, water vapor is employed as a tracer gas. This obviates many of the safety measures mentioned above, which are necessary when using carbon dioxide.

For the determination of the fresh air volume flow by using water vapor as a tracer gas, a defined water vapor mass flow, determined by weighing, is preferably introduced into the passenger compartment or generated directly in the passenger compartment.

If persons (measurement personnel) need to remain in the passenger compartment while carrying out the measurement, the water given off by them must be taken into account. The water mass flow given off by a person is in this case given by the ratio of latent heat release by the person and specific enthalpy of vaporization of water. The latent heat release by a person, normally clothed and seated, may be obtained from the air conditioning comfort standards for rail vehicles (EN 14813, EN 14750 or EN 13129). To this extent, the value of a water mass flow $\dot{m}_p$ given off by a person is a predetermined rather than measured value.

With the fresh air volume flow, a further water vapor mass flow is introduced into the passenger compartment. In this case, any leakage air is preferably regarded as additional fresh air.

The water vapor mass flow removed with the outlet air from the passenger compartment reduces the specific air humidity in the interior. After a certain time, a quasi-stationary air humidity is reached in the passenger compartment, after which a calculated value of the fresh air volume flow may be obtained with the aid of the equation specified above.

Preferably, the specific air humidity of the fresh air and/or the specific air humidity of the compartment air may be determined by means of moisture sensors of an air conditioning system of the vehicle. Alternatively, it is possible for the specific air humidity of the fresh air and/or the specific air humidity of the compartment air to be determined respectively by means of sensors for an air temperature and a wet bulb temperature.

In respect of the device, the object indicated above is achieved by a device having the features as claimed.

Accordingly, a device for determining a fresh air volume flow in a vehicle for transporting people is provided, comprising
  a water reservoir for introducing or generating a defined water vapor mass flow into/in a passenger compartment of the vehicle,
  a monitoring device for an air humidity in the passenger compartment of the vehicle, and
  a calculation unit which, after a quasi-stationary air humidity has been reached in the passenger compartment, calculates the fresh air volume flow according to the following equation:

$$\dot{V}_{fr} = \frac{\dot{m}_{ev} + n \cdot \dot{m}_p}{\rho_{fr} \cdot x_{fr} - \rho_i \cdot x_i}$$

with
  $\dot{V}_{fr}$ fresh air volume flow [m³/h]
  $\dot{m}_{ev}$ mass of the evaporated water in the interior [kg/h]
  n number of people in the compartment
  $\dot{m}_p$ water mass flow given off by a person [kg/h]
  $\rho_{fr}$ density of the fresh air (humid air) [kg/m³]
  $x_{fr}$ specific air humidity of the fresh air [kg/kg]
  $\rho_i$ density of the compartment air (humid air) [kg/m³]
  $x_i$ specific air humidity of the compartment air [kg/kg].

The water reservoir provided preferably comprises a heater for the water vaporization and a weighing cell, which are preferably arranged in the air flow of the incoming air.

Preferably, the following equipment is used for measuring the fresh air volume flow in a vehicle for transporting people:
  heating device with water vessel,
  weighing balance,
  temperature sensor(s) for determining the air temperature in the passenger compartment,
  air humidity sensor(s) for determining the air humidity in the passenger compartment,
  temperature sensor(s) for determining the external temperature (fresh air),
  air humidity sensor(s) for determining the external humidity (fresh air),
  weighing balance for determining the amount of water evaporated,
  evaluation software.

For reliability of the calculated value of the fresh air volume flow, it is important to avoid any condensation of the water vapor in the vehicle (for example on carriage wall surfaces and ducts), since this vitiates the mass balance and therefore also the calculated result. In modern rail vehicles, however, the likelihood of the condensation of water vapor in the vehicle is low because they are generally well insulated. Furthermore, falling below the dew point may be avoided by a suitable choice of a higher interior temperature. Condensation of water vapor may optionally also be compensated for by correction factors in the calculation of the fresh air volume flow.

It should be emphasized that water is readily available, and at very low prices. For the required verification measurements, water and water vapor entail no risks. The determination of the water mass flow by means of weighing is very accurate, especially in comparison with a carbon dioxide volume flow. Dosing in the case of water vapor is likewise simple and scalable.

BRIEF DESCRIPTION OF DRAWING

An exemplary embodiment of the invention will be explained in more detail below with reference to the drawing. The single figure shows a schematic representation of an air conditioning arrangement of a rail vehicle.

DETAILED DESCRIPTION OF THE INVENTION

The figure shows a longitudinal section of a carriage body of a rail vehicle, which is used as an example of a vehicle for transporting people. A passenger compartment 1 of the rail vehicle is fed with conditioned inlet air by means of an air conditioning system 2.

Data relating to currently prevailing climatic conditions are provided to the air conditioning system 2 by means of a number of sensors. For the interior air which is contained in the passenger compartment 1, a temperature sensor 3 and a moisture sensor 4 for determining the specific air humidity $x_i$ of the compartment air are provided.

In order to supply the passenger compartment 1 with conditioned inlet air, the air conditioning system 2 delivers fresh air from outside the vehicle by means of a fresh air fan (not represented) through a fresh air opening 5 into the passenger compartment 1. Furthermore, the air conditioning system 2 controls an outlet air fan (not represented), which expels compartment air taken from the passenger compartment 1 through an outlet air opening 6 to outside the vehicle.

In order to determine the climatic parameters of the fresh air to be introduced, the air conditioning system comprises an external temperature sensor 7 and a moisture sensor 8, arranged in the region of the intake opening 5 for fresh air, with the aid of which the specific air humidity $x_{fr}$ of the fresh air can be determined.

All the sensors, namely the sensor for the internal temperature 3, the internal air humidity 4, the external temperature 5 and the external humidity 8 have a signal transmission connection to the air conditioning system 2. The latter evaluates the measurement values delivered by the sensors 3, 4, 7, 8 for determination of the fresh air volume flow.

In order to perform a metrological verification that the fresh air volume flow meets the relevant standards for the operation of a vehicle for transporting people, here for example a rail vehicle, the air conditioning system described above is supplemented with a water reservoir 9, which in the exemplary embodiment represented is arranged in the passenger compartment 1, for example in the air flow of the inlet air. A heating device 10, which may be configured as an immersion heater, is provided inside the water reservoir 9. The water reservoir 9 is equipped with a discharge valve 11 in order to introduce water vapor into the passenger compartment 1 of the rail vehicle in a defined and dosed way. The water reservoir 9 is furthermore equipped with a weighing cell 12, so that it is possible to establish by measurement the mass of water which has been evaporated and introduced into the passenger compartment 1 in the course of a measurement process for the fresh air volume flow.

With combined use of the air conditioning arrangement described above and the water reservoir 9 in a device for determining a fresh air volume flow in a vehicle for transporting people, the fresh air volume flow may be ascertained by means of the following equation:

$$\dot{V}_{fr} = \frac{\dot{m}_{ev} + n \cdot \dot{m}_p}{\rho_{fr} \cdot x_{fr} - \rho_i \cdot x_i}$$

with
 $\dot{V}_{fr}$ fresh air volume flow [m³/h]
 $\dot{m}_{ev}$ they mass of the evaporated water in the interior [kg/h]
 n number of people in the compartment
 $\dot{m}_p$ water mass flow given off by a person [kg/h]
 $\rho_{fr}$ density of the fresh air (humid air) [kg/m³]
 $x_{fr}$ specific air humidity of the fresh air [kg/kg]
 $\rho_i$ density of the compartment air (humid air) [kg/m³]
 $x_i$ specific air humidity of the compartment air [kg/kg].

The value of a water mass flow $\dot{m}_p$ given off by a person is in this case a predetermined value which may be obtained from relevant standards. Air entering the passenger compartment 1 through any leaks of the vehicle is regarded as further fresh air for the calculation of the fresh air volume flow.

1 In the exemplary embodiment represented, the specific air humidity $x_{fr}$ of the fresh air and the specific air humidity $x_i$ of the compartment air are determined by the moisture sensors 4, 8 of the air conditioning system. Alternatively (not represented) it is also possible respectively to determine the specific air humidity $x_{fr}$ of the fresh air and/or the specific air humidity $x_i$ of the compartment air respectively by means of sensors for an air temperature and a wet bulb temperature. The wet bulb temperature may, for example, be ascertained by means of an air temperature sensor which is wetted by means of a cotton sock.

The determination of the fresh air volume flow by means of the equation above is not carried out until a quasi-stationary air humidity has become established in the passenger compartment 1.

It should be emphasized that, in the present exemplary embodiment, the air conditioning system performs the function of a monitoring device for an air humidity in the passenger compartment 1 of the vehicle as well as a calculation unit for the determination of the fresh air volume flow, and that the required evaluation software is run on the air conditioning system. It should be pointed out that these functions need not necessarily be performed by the air conditioning system.

The invention claimed is:

1. A method for determining a fresh air volume flow in a vehicle for transporting persons, the method comprising:
 introducing or generating a defined water vapor mass flow into or in a passenger compartment of the vehicle;
 monitoring an air humidity in the passenger compartment of the vehicle;
 after a quasi-stationary air humidity has been reached in the passenger compartment, calculating the fresh air volume flow according to the following equation:

$$\dot{V}_{fr} = \frac{\dot{m}_{ev} + n \cdot \dot{m}_p}{\rho_{fr} \cdot x_{fr} - \rho_i \cdot x_i}$$

where:
 $\dot{V}_{fr}$ fresh air volume flow [m³/h]
 $\dot{m}_{ev}$ they mass of the evaporated water in the interior [kg/h]
 n number of people in the compartment
 $\dot{m}_p$ water mass flow given off by a person [kg/h]
 $\rho_{fr}$ density of the fresh air (humid air) [kg/m³]
 $x_{fr}$ specific air humidity of the fresh air [kg/kg]
 $\rho_i$ density of the compartment air (humid air) [kg/m³]
 $x_i$ specific air humidity of the compartment air [kg/kg],
 utilizing the fresh air volume flow $\dot{V}_{fr}$ to assure or verify a compliance with a required air quality in the passenger compartment.

2. The method according to claim 1, wherein the value of a water mass flow $\dot{m}_p$ given off by a person is a predetermined value.

3. The method according to claim 1, which comprises regarding air entering into the passenger compartment through leaks of the vehicle as further fresh air.

4. The method according to claim 1, which comprises determining at least one of the specific air humidity $x_{fr}$ of the fresh air or of the specific air humidity $x_i$ of the compartment air by moisture sensors.

5. The method according to claim 4, wherein the moisture sensors are sensors of an air conditioning system of the vehicle.

6. The method according to claim 1, which comprises respectively determining at least one of the specific air humidity $x_{fr}$ of the fresh air or the specific air humidity $x_i$ of the compartment air by sensors for an air temperature and a wet bulb temperature.

7. A device for determining a fresh air volume flow in a vehicle for transporting persons, the device comprising:
 a water reservoir for introducing or generating a defined water mass flow into/in a passenger compartment of the vehicle,
 a monitoring device for monitoring an air humidity in the passenger compartment of the vehicle;
 a calculation unit configured, after a quasi-stationary air humidity has been reached in the passenger compartment, to calculate the fresh air volume flow in the vehicle according to the following equation:

$$\dot{V}_{fr} = \frac{\dot{m}_{ev} + n \cdot \dot{m}_p}{\rho_{fr} \cdot x_{fr} - \rho_i \cdot x_i}$$

where:
 $\dot{V}_{fr}$ fresh air volume flow [m³/h]
 $\dot{m}_{ev}$ they mass of the evaporated water in the interior [kg/h]
 n number of people in the compartment
 $\dot{m}_p$ water mass flow given off by a person [kg/h]
 $\rho_{fr}$ density of the fresh air (humid air) [kg/m³]
 $x_{fr}$ specific air humidity of the fresh air [kg/kg]
 $\rho_i$ density of the compartment air (humid air) [kg/m³]
 $x_i$ specific air humidity of the compartment air [kg/kg].

8. The device according to claim 7, wherein said water reservoir comprises a heater for water vaporization and a weighing cell.

9. The device according to claim 7, further comprising moisture sensors for determining at least one of the specific air humidity $x_{fr}$ of the fresh air or the specific air humidity $x_i$ of the compartment air.

10. The device according to claim 7, which comprises a sensor for an air temperature and a wet bulb temperature for determining at least one of the specific air humidity $x_{fr}$ of the fresh air or the specific air humidity $x_i$ of the compartment air.

\* \* \* \* \*